(12) United States Patent
Goto

(10) Patent No.: US 10,012,332 B2
(45) Date of Patent: Jul. 3, 2018

(54) TUBULAR THREADED JOINT HAVING IMPROVED HIGH-TORQUE MAKEUP PROPERTIES

(71) Applicants: NIPPON STEEL & SUMITOMO METAL CORPORATION, Tokyo (JP); VALLOUREC OIL AND GAS FRANCE, Aulnoye-Aymeries (FR)

(72) Inventor: Kunio Goto, Tokyo (JP)

(73) Assignees: NIPPON STEEL & SUMITOMO METAL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 692 days.

(21) Appl. No.: 14/402,354

(22) PCT Filed: May 21, 2013

(86) PCT No.: PCT/JP2013/064558
§ 371 (c)(1),
(2) Date: Nov. 20, 2014

(87) PCT Pub. No.: WO2013/176281
PCT Pub. Date: Nov. 28, 2013

(65) Prior Publication Data
US 2015/0192229 A1    Jul. 9, 2015

(30) Foreign Application Priority Data
May 23, 2012 (JP) .................................. 2012-117550

(51) Int. Cl.
*F16L 15/00* (2006.01)
*E21B 17/042* (2006.01)
(Continued)

(52) U.S. Cl.
CPC .......... *F16L 15/00* (2013.01); *C10M 171/00* (2013.01); *C10M 177/00* (2013.01);
(Continued)

(58) Field of Classification Search
CPC ....... F16L 15/08; F16L 19/0243; F16L 58/04; F16L 58/12; F16L 58/182
(Continued)

(56) References Cited

U.S. PATENT DOCUMENTS

| 6,933,264 B2 * | 8/2005 | Petelot | F16L 58/182 |
| | | | 285/333 |
| 6,971,681 B2 * | 12/2005 | Dell'Erba | F16L 58/182 |
| | | | 285/333 |

(Continued)

FOREIGN PATENT DOCUMENTS

| DE | 3432001 | 10/1985 |
| EP | 0 488 912 | 6/1992 |

(Continued)

*Primary Examiner* — David Bochna
(74) *Attorney, Agent, or Firm* — Clark & Brody

(57) ABSTRACT

A tubular threaded joint has a pin and a box. Each having a contact surface comprising a threaded portion and an unthreaded metal contact portion including a seal portion and a shoulder portion. A solid lubricating coating having a relatively high Knoop hardness is formed on a portion including the shoulder portion of the contact surface, such as the unthreaded metal contact portion including the shoulder portion and the seal portion, of at least one of the pin and the box. A solid lubricating coating having a relatively low Knoop hardness is formed at least on the remaining portion of the contact surface, such as the threaded portion. The threaded joint has excellent galling resistance, gas tightness, and rust preventing properties. The joint does not readily (Continued)

undergo yielding of shoulder portions even when made up with a high torque, thereby making it possible to perform makeup in a stable manner.

8 Claims, 7 Drawing Sheets

(51) Int. Cl.
*F16L 58/18* (2006.01)
*C10M 171/00* (2006.01)
*C10M 177/00* (2006.01)

(52) U.S. Cl.
CPC .......... *E21B 17/042* (2013.01); *F16L 58/182* (2013.01); *C10M 2201/0663* (2013.01); *C10M 2209/1003* (2013.01); *C10M 2213/0623* (2013.01); *C10M 2217/0443* (2013.01); *C10N 2230/00* (2013.01); *C10N 2230/06* (2013.01); *C10N 2230/12* (2013.01); *C10N 2240/22* (2013.01); *C10N 2250/14* (2013.01); *C10N 2280/00* (2013.01); *F16L 2201/40* (2013.01)

(58) Field of Classification Search
USPC .................................................. 285/333, 334
See application file for complete search history.

(56) References Cited

U.S. PATENT DOCUMENTS

| | | | |
|---|---|---|---|
| 8,052,173 | B2 * | 11/2011 | Carcagno .............. F16L 58/182 285/333 |
| 2003/0159764 | A1 | 8/2003 | Goto |
| 2009/0033087 | A1 | 2/2009 | Carcagno et al. |
| 2009/0324363 | A1 | 12/2009 | Abbott et al. |
| 2011/0084483 | A1 | 4/2011 | Nunez |
| 2014/0284919 | A1 * | 9/2014 | Goto ....................... F16L 15/08 285/94 |

FOREIGN PATENT DOCUMENTS

| | | |
|---|---|---|
| EP | 1 350 834 | 10/2003 |
| EP | 2 216 576 | 8/2010 |
| WO | 2007/026970 | 3/2007 |
| WO | 2007/063079 | 6/2007 |
| WO | 2010/114168 | 10/2010 |
| WO | 2010/140703 | 12/2010 |

* cited by examiner

TUBULAR THREADED JOINT HAVING IMPROVED HIGH-TORQUE MAKEUP PROPERTIES

TECHNICAL FIELD

This invention relates to a tubular threaded joint for use in connecting steel pipes and particularly oil country tubular goods. A tubular threaded joint according to the present invention can reliably exhibit excellent galling resistance without application of a lubricating grease such as compound grease, which has in the past been applied to threaded joints at the time of makeup of oil country tubular goods. As a result, a tubular threaded joint according to the present invention can avoid the adverse effects of compound grease on the global environment and humans. In addition, the joint does not readily undergo yielding even when it is made up with a high torque, so a stable metal-to-metal seal can be realized with an adequate margin.

BACKGROUND ART

Oil country tubular goods such as tubing and casing used for digging of oil wells for crude oil or gas oil are typically connected to each other using tubular threaded joints. In the past, the depth of oil wells was at most 2,000-3,000 meters but it sometimes reaches 8,000-10,000 meters in recent deep wells such as in offshore oil fields. The length of oil country tubular goods is typically 10 some meters, and the periphery of tubing through which fluid such as crude oil flows is surrounded by a plurality of casings. Therefore, the number of oil country tubular goods which are connected by threaded joints reaches a huge number.

In their environment of use, tubular threaded joints for oil country tubular goods are subjected to loads in the form of axial tensile forces caused by the mass of oil country tubular goods and the joints themselves, to compound pressures such as internal and external pressures, and to geothermal heat. Therefore, it is necessary that the threaded joints maintain gas tightness without being damaged even in such a severe environment.

A typical tubular threaded joint used for connecting oil country tubular goods (also referred to as a special threaded joint) has a pin-box structure. A pin, which is a joint component having male threads, is typically formed on both ends of an oil country tubular good, and a box, which is a mating joint component, having female threads which threadingly engage with the male threads, is typically formed on the inner surface of both sides of a coupling, which is a separate member. As shown in FIG. 1, a seal portion is provided on the outer peripheral surface in the vicinity of the end surface on the side closer to the end of the pin than the male threads and on the inner peripheral surface of the base portion of the female threads of the box, and a shoulder portion (also referred to as a torque shoulder) is provided on the end surface at the end of the pin and on the corresponding rearmost portion of the box. The seal portions and the shoulder portions of the pin and the box constitute unthreaded metal contact portions of the tubular threaded joint, and the unthreaded metal contact portions and the threaded portions of the pin and the box constitute the contact surfaces of the tubular threaded joint. Below-identified Patent Document 1 shows an example of this type of special threaded joint.

When performing makeup of such a tubular threaded joint, one end of an oil country tubular good (a pin) is inserted into a coupling (a box), and the male threads and the female threads are tightened until the shoulder portions of the pin and the box contact each other and interfere under a suitable torque. As a result, the seal portions of the pin and the box intimately contact each other and form a metal-to-metal seal, whereby gas tightness of the threaded joint is guaranteed.

Due to various problems when lowering tubing or casing into an oil well, a tubular joint which was previously made up is sometimes broken out, the joint is raised from the oil well, it is remade up, and then it is again lowered into the well. API (American Petroleum Institute) requires galling resistance such that unrepairable severe seizing referred to as galling does not take place and gas tightness is maintained even when makeup and breakout are carried out 10 times for a joint for tubing and 3 times for a joint for casing.

In order to increase galling resistance and gas tightness, a viscous liquid lubricant (a lubricating grease) containing heavy metal powder and referred to as compound grease has been previously applied to the contact surfaces of a threaded joint each time makeup has been carried out. Such compound grease is prescribed by API BUL 5A2.

With the object of increasing the retention of compound grease and improving its sliding properties, it has been proposed to subject the contact surfaces of a threaded joint to various types of surface treatment such as nitriding treatment, various types of plating such as zinc plating or composite plating, and phosphate chemical conversion treatment to form one or more layers on the contact surfaces. However, as described below, the use of compound grease raises the concern of an adverse effect on the environment and humans.

Compound grease contains a large amount of heavy metal powders such as zinc, lead, and copper powders. At the time of makeup of a threaded joint, the applied grease is washed off or squeezed out to the exterior surface, and there is the possibility of an adverse effect on the environment and especially on sea life particularly due to harmful heavy metals such as lead. In addition, the process of applying compound grease worsens the operating environment and operating efficiency and may cause harm to humans.

As a result of the enactment in 1998 of the OSPAR Convention (Oslo-Paris Convention) with the object of preventing maritime pollution in the northeast Atlantic, in recent years, strict environmental restrictions are being enacted on a global scale, and in some regions, the use of compound grease is already regulated. Accordingly, in order to avoid an adverse effect on the environment and humans in the process of digging gas wells and oil wells, a demand has developed for threaded joints which can exhibit excellent galling resistance without using compound grease.

As a threaded joint which can be used for connecting oil country tubular goods without application of compound grease, the present applicant proposed in below-identified Patent Document 2 a threaded joint for steel pipes having a viscous liquid or semisolid lubricating coating formed thereon, and in below-identified Patent Document 3, they proposed a threaded joint for steel pipes having a solid lubricating coating formed thereon.

Below-identified Patent Document 4 discloses forming a high-friction lubricating layer on the entirety of the contact surface of a pin or a box and forming a low-friction lubricating layer on specified portions of the contact surface of a pin or a box (when the low friction layer and the high friction layer are disposed on each other, the low-friction layer is the upper layer). The specified portions on which the low-friction lubricating layer is formed are specifically a metal-to-metal seal portion and thread crests and roots, and it is described in that document that only the high-friction lubricating layer preferably remains on a shoulder portion and thread load flanks. However, it is very difficult to form the low-friction lubricating layer on only the thread crests, roots, and stab flanks of the threaded portion without forming it on the thread load flanks

PRIOR ART DOCUMENTS

Patent Documents

Patent Document 1: EP 0488912A2
Patent Document 2: EP 1350834A1
Patent Document 3: EP 2216576A1
Patent Document 4: WO 2007/063079

SUMMARY OF THE INVENTION

With a special threaded joint like the one shown in FIG. 1 which has seal portions and shoulder portions, gas tightness is guaranteed by forming a metal-to-metal seal between the seal portions of the pin and the box at the time of makeup.

FIG. 2 shows a torque chart (ordinate: torque, abscissa: number of turns) of this type of threaded joint at the time of makeup. As shown in this figure, as turning takes place, the threaded portions of the pin and the box initially contact and the torque gradually increases. Subsequently, the seal portions of the pin and the box contact each other, and the rate of increase of the torque increases. Finally, the shoulder portion on the end of the pin and the shoulder portion of the box contact each other and begin to interfere (the torque at the start of this interference is referred to as the shouldering torque and is indicated as Ts), upon which the torque abruptly increases. Makeup is completed when the torque reaches a predetermined makeup torque. The optimal torque in FIG. 2 means the optimal torque for completing makeup so as to achieve the contact pressure sufficient to guarantee gas tightness in the seal portions between the pin and the box. A suitable prescribed value for the optimal torque is previously set based on the inner diameter and the type of the joint.

When a special threaded joint is used in a very deep well in which compressive stresses and bending stresses are applied, makeup is sometimes carried out with a higher than usual optimal torque so that loosening will not take place with certainty. In this case, yielding of either one or both of the shoulder portion on the end surface of the pin and the shoulder portion of the box which contacts it may occur (the torque when yielding occurs is referred to as the yield torque Ty), and as shown in FIG. 2, the shoulder portion (the pin shoulder portion in the illustrated case) plastically deforms. When such yielding occurs, the rate of increase of the torque greatly decreases.

In the case of a threaded joint which is to be made up with a high torque, it is advantageous for the difference between Ty and Ts or [Ty−Ts] (=ΔT: torque on shoulder resistance) to be large. However, with the tubular threaded joints described in Patent Document 2 or Patent Document 3 having a viscous liquid or semisolid lubricating coating or a solid lubricating coating, Ty is reduced compared to the case in which conventional compound grease is applied. As a result, ΔT becomes small, and the shoulder portions end up yielding at a low makeup torque, whereby it is sometimes not possible to carry out makeup with a high torque.

The object of the present invention is to provide a tubular threaded joint which does not readily undergo yielding of its shoulder portions even when it is made up with a high torque and which has a lubricating coating which does not contain harmful heavy metals, which has excellent galling resistance, gas tightness, and rust preventing properties, and which makes it possible to ensure a large ΔT.

It is known that even if the composition of a lubricating coating is varied so as to change its coefficient of friction, ΔT does not greatly vary because Ts and Ty generally vary in the same manner. For example, if the coefficient of friction of a lubricating coating increases, Ty increases, but Ts also increases (a phenomenon referred to as high shouldering). As a result, in the worst case, the shoulder portions do not contact each other at a prescribed makeup torque, and a condition referred to as no-shouldering in which makeup is not completed takes place.

The present inventors found that with a tubular threaded joint having a solid lubricating coating which does not contain harmful heavy metals which impose a burden on the global environment, by forming a first solid lubricating coating on a portion of the contact surface (the threaded portion and the unthreaded metal contact portion) of at least one of a pin and a box, specifically a portion of the contact surface including the shoulder portion which undergoes contact at a high pressure and preferably a portion of the contact surface including the shoulder portion and the seal portion, and by forming a second solid lubricating coating which has a lower Knoop hardness than does the first solid lubricating coating on the other portions of the contact surface, a tubular threaded joint is obtained which has sufficient galling resistance, gas tightness, and rust preventing properties while having a large ΔT and with which there is no danger of the occurrence of no-shouldering.

The mechanism of increasing ΔT by the difference in the Knoop hardness of the first and second solid lubricating coatings is thought to be generally as follows.

As a result of investigations, the present inventors found that the higher the hardness of a solid lubricating coating, the higher is Ty, and conversely, the lower the hardness, the lower is Ts. This is conjectured to be because a solid lubricating coating having a high hardness and hence high wear resistance does not readily deform at the time of sliding under a high pressure and it does not readily discharge powder formed by abrasion, so it produces a sliding surface having a high resistance to sliding. On the other hand, a solid coating having a low hardness easily deforms at the time of sliding even under a low pressure and easily wears, so sliding of the sliding surface easily takes place.

In general, it is known from examples such as metal plating (high hardness) and rubber (low hardness) that there is a tendency for a solid lubricating coating having a high hardness to have a low coefficient of friction and for a solid lubricating coating having a low hardness to have a high coefficient of friction. However, the above-described behaviors and effects of a solid coating having a high hardness or a low hardness under a high pressure or a low pressure in a tubular threaded joint cannot be explained just by the magnitude of the coefficient of friction. It is thought that the factor which is closely related to Ts and Ty at the time of makeup of a joint is the magnitude of the internal fracture strength of a solid coating during wear rather than the amount of friction (the ease of sliding) of the surface of the coating.

The above-mentioned Patent Document 4 proposes the formation of a high-friction lubricating coating and a low-friction lubricating coating. However, the coefficient of friction of a solid coating is dependent on the pressure and it does not always correlate to the hardness of the coating.

In the present invention, hardness, which does not depend on the pressure and correlates to the internal fracture strength of a solid coating, is employed to distinguish the first and second lubricating coatings.

Makeup of a tubular threaded joint is carried out by inserting a pin into a box and then rotating the pin or the box. Initially only the threaded portions contact to allow the threads to threadingly engage, and the makeup torque gradually increases, as shown in FIG. 2. In the final stage of makeup, the seal portions and the shoulder portions begin to contact. Makeup is completed when prescribed contact pressure (which is expressed by a prescribed torque such as the optimal torque) in the seal portions between the pin and the box are achieved.

According to the present invention, for example, as shown in FIG. 5, a tubular threaded joint has a first solid lubricating coating on the seal portions and the shoulder portions of the contact surfaces of a pin and a box and a second solid lubricating coating, which has a lower Knoop hardness than the first solid lubricating coating, on the other portions (primarily the threaded portions) of the contact surfaces. In this threaded joint, before the seal portions and the shoulder portions contact, Ts remains low due to the contact occurring by the second solid lubricating coating which covers the threaded portions and which has a low hardness and a low internal fracture strength. In the final stage of makeup, when the seal portions and the shoulder portions start to contact, the first solid lubricating coating which has a higher Knoop hardness than the second solid lubricating coating and which coats these portions participates in contact. Accordingly, a state occurs in which the internal fracture strength of the coating is high, and Ty increases. As a result, ΔT increases. An increase in ΔT due to an increase in Ty can also be achieved when the harder first solid lubricating coating is formed on only the shoulder portions, which are exposed to a particularly high pressure during makeup.

The present invention, which is based on the above finding, is a tubular threaded joint comprised of a pin and a box each having a contact surface comprising a threaded portion and an unthreaded metal contact portion which includes a seal portion and a shoulder portion, characterized in that a first solid lubricating coating is present on a portion including the shoulder portion of the contact surface of at least one of the pin and the box, a second solid lubricating coating is present on at least a portion of the contact surface of the at least one of the pin and the box which does not have the first solid lubricating coating, the Knoop hardness of the first solid lubricating coating is higher than the Knoop hardness of the second solid lubricating coating, and when a portion is present which has both the first and the second solid lubricating coatings, the second solid lubricating coating is positioned below the first solid lubricating coating.

Knoop hardness (abbreviated as Hk) is a type of indentation hardness. As shown by the following equation, it is determined by dividing the test load P by the indentation surface area $L^2$ obtained in an indentation hardness test.

$$Hk = P/C_p/L^2$$

where,

Hk: Knoop hardness.
P: load (kgf),
$C_p$: correction factor (0.070279), and
$L^2$: surface area of indentation (mm$^2$).

The value of the Knoop hardness (Hk) consecutively changes in accordance with the hardness, so it is generally used as a quantitative index of hardness which can measure the surface hardness of a solid coating with comparatively good sensitivity. A method of measuring Knoop hardness is prescribed by the Knoop hardness test method (JIS B 7734 and JIS Z 2251). For example, it can be measured using a model HMV-200 microhardness tester manufactured by Shimadzu Corporation under conditions of 100 grams for 10 seconds. In the present invention, a value of the Knoop hardness measured under these conditions is employed.

The portion of the contact surface having the above-described first solid lubricating coating may be just the shoulder portion, but preferably it is the entire unthreaded metal contact portion including the seal portion and the shoulder portion.

The second solid lubricating coating may be provided only on the portion of the contact surface not having the first solid lubricating coating, or it may be provided on the entirety of the contact surface including the portion having the first solid lubricating coating. In the latter case, there are portions on which both the first solid lubricating coating and the second solid lubricating coating are formed. In this case, the second solid lubricating coating is made a lower layer and the first solid lubricating coating is made an upper layer.

The thickness of the first and second solid lubricating coatings is each preferably in the range of 10-150 μm. However, in portions having both the first and second solid lubricating coatings, the total thickness of the coatings is preferably at most 200 μm.

When the contact surface of only one of the pin and the box has the first solid lubricating coating and the second solid lubricating coating, there are no particular limitations on the contact surface of the other member, and it may be untreated (for example, it may be in a state after the below-described preparatory surface treatment). However, from the standpoints of rust preventing properties and lubricating properties, preferably at least a portion of the contact surface of the other member and preferably the entirety of the contact surface thereof has any of the following surface treatment coatings formed thereon:

1) a liquid lubricating coating (including a viscous liquid lubricating coating and a semisolid lubricating coating);
2) a solid lubricating coating (including the above-described first or second solid lubricating coating);
3) a solid corrosion protective coating; or
4) a multiple-layer coating combining at least two of the above coatings.

The solid corrosion protective coating is preferably a solid coating based on a UV-curable resin.

The contact surface of at least one and preferably both of the pin and the box can previously undergo surface treatment by one or more methods selected from blasting, pickling, phosphate chemical conversion treatment, oxalate chemical conversion treatment, borate chemical conversion treatment, electroplating, impact plating, and combination of these in order to increase the adhesion or retention of the coating formed atop it and/or to increase the galling resistance of the threaded joint.

A tubular threaded joint according to the present invention has on its contact surface a surface treatment coating which exhibits a large ΔT which is equal to or larger than that of a coating formed of a lubricating grease such as conventional compound grease which contains harmful heavy metals. Therefore, it makes it possible to carry out makeup operations without the occurrence of yielding of the shoulder portions or galling even when makeup is carried out with a high torque. In addition, the coating can suppress galling under severe conditions such as in unstable drilling operations in the sea. In contrast to compound grease, the surface treatment coating contains substantially no harmful heavy metals such as lead, so it imposes almost no burden on the global environment. A tubular threaded joint according to the present invention suppresses the occurrence of rust, and it continues to exhibit lubricating performance even when makeup and breakout are repeated while guaranteeing gas tightness after makeup.

MODES FOR CARRYING OUT THE INVENTION

Below, embodiments of a tubular threaded joint according to the present invention will be explained in detail by way of example. In the following explanation, unless otherwise specified, percent means mass percent.

Figure 3:
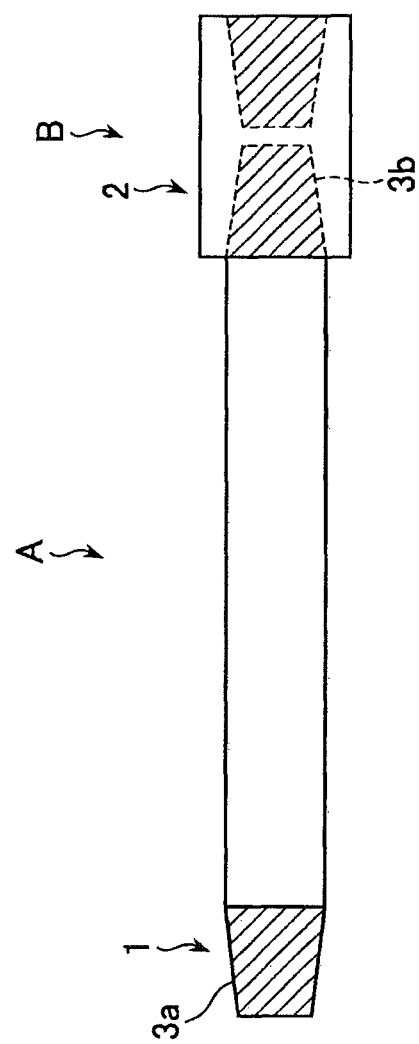
FIG. 3 schematically shows the assembled structure of a steel pipe and a coupling at the time of shipment of the steel pipe.

FIG. 3 schematically shows the state at the time of shipment of a typical tubular threaded joint. A pin 1 having a male threaded portion 3a on its outer surface is formed on both ends of a steel pipe A, and a box 2 having a female threaded portion 3b on its inner surface is formed on both sides of a coupling B. The coupling B is previously connected to one end of the steel pipe A. Although not shown in the drawing, prior to shipment, a protector for protecting the threaded portions is mounted on the pin of the steel pipe A and the box of the coupling B which are not connected to other members. These protectors are removed before use of the threaded joint.

As shown in the drawing, with a typical tubular threaded joint, a pin is formed on the outer surface of both ends of a steel pipe, and a box is formed on the inner surface of a coupling, which is a separate member. There are also integral tubular threaded joints which do not use a coupling and in which one end of a steel pipe is made a pin and the other end is made a box. A tubular threaded joint according to the present invention can be applied to either type.

Figure 4:
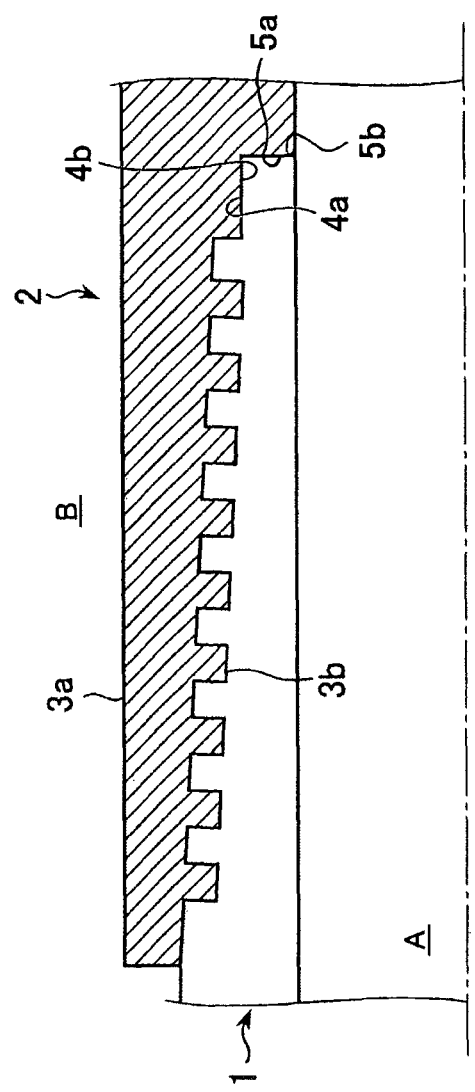
FIG. 4 schematically shows a cross section of a special threaded joint.

FIG. 4 schematically illustrates the structure of a special threaded joint (referred to below simply as a threaded joint), which is a typical tubular threaded joint used for connecting oil country tubular goods. This threaded joint comprises a pin 1 formed on the outer surface of the end of a steel pipe A and a box 2 formed on the inner surface of a coupling B. The pin 1 has a male threaded portion 3a, a seal portion 4a positioned in the vicinity of the end of the steel pipe, and a shoulder portion 5a on its end surface. Correspondingly, the box 2 has a female threaded portion 3b, a seal portion 4b, and a shoulder portion 5b on the inner side of the female threaded portion 3b.

The seal portions and the shoulder portions of the pin 1 and the box 2 constitute unthreaded metal contact portions, and the unthreaded metal contact portions (namely, the seal portions and the shoulder portions) and the threaded portions thereof constitute the contact surfaces of the threaded joint. These contact surfaces are required to have galling resistance, gas tightness, and rust preventing properties. In the past, for this purpose, compound grease containing heavy metal powders was applied to the contact surfaces, or a viscous liquid, semisolid, or solid lubricating coating was formed on the contact surfaces. However, as stated above, the former has an adverse effect on humans and the environment, and the latter has the problem that $\Delta T$ is small, so there is the possibility of the shoulder portions yielding before the completion of makeup when makeup is performed with a high torque.

In a threaded joint according to the present invention, at least one of a pin and a box has a first solid lubricating coating on a portion of the contact surface thereof including at least the shoulder portion and a second solid lubricating coating on at least a portion of the contact surface which does not have the first solid lubricating coating, and the first solid lubricating coating is a coating which has a higher Knoop hardness than the second solid lubricating coating.

Below, the first solid lubricating coating will be referred to as a high-hardness solid lubricating coating, and the second solid lubricating coating will be referred to as a low-hardness solid lubricating coating.

However, in locations close to the threaded portions between the threaded portions and the seal portions of the threaded joint, a portion where the pin and the box do not contact each other even when the threaded joint is in a madeup state is usually provided with the object of releasing lubricant components which are forced out at the time of makeup of a threaded joint. In some threaded joints, a non-contacting region where the pin and the box do not contact is intentionally provided, for example, at a location between the seal portions and the shoulder portions. A portion where the pin and the box do not contact when a threaded joint is in a madeup state is not included in the contact surfaces, and a coating according to the present invention may or may not be provided on such a portion.

The high-hardness solid lubricating coating is formed only on a portion including the shoulder portion of the contact surface of one or both of the pin and the box. The portion of the contact surface having the high-hardness solid lubricating coating may be just the shoulder portion, but preferably it is the entire unthreaded metal contact portion including the seal portion and the shoulder portion. Namely, the high-hardness solid lubricating coating is preferably need on the seal portion and the shoulder portion of the contact surface. The second or low-hardness solid lubricating coating is formed on at least the portion of the contact surface not having the high-hardness solid lubricating coating. It may be formed on the entirety of the contact surface. In this case, a portion of the contact surface has two solid lubricating coatings, and the low-hardness solid lubricating coating is positioned below the high-hardness solid lubricating coating. It is also possible to form the low-hardness solid lubricating coating just on the portion where the high-hardness solid lubricating coating is not formed (such as just on the threaded portion).

When a portion of the contact surface of just one of the pin and the box has the high-hardness solid lubricating coating and the low-hardness solid lubricating coating, there are no particular limitations on the surface treatment of the contact surface of the other member. For example, the same or different type of solid lubricating coating as is used as the low-hardness solid lubricating coating or the high-hardness solid lubricating coating formed on the contact surface of the one of the members, a liquid lubricating coating, a solid corrosion protective coating, or a multiple-layered coating which is a combination of two or more of these can be formed on at least a portion and preferably on the entirety of the contact surface of the other member. A liquid lubricating coating encompasses a coating of a lubricating oil and a viscous liquid or semisolid lubricating coating. Alternatively, the contact surface of the other member may be left untreated, or it may be subjected to just the below-described preparatory surface treatment for surface roughening (such as phosphate chemical conversion treatment).

FIG. 5, FIGS. 6(A) and 6(B), and FIG. 7 show various possible embodiments of the structures of coatings formed on the contact surfaces of a pin and a box. In these figures, of the male threads formed on the threaded portion of the pin 1, the threads 3a' on the extreme end adjoining the seal portion are shown as an incomplete thread which is seen at the start of thread cutting. By making the thread at the extreme end of the pin an incomplete thread, stabbing of the pin becomes easier, and the possibility of damaging the threaded portion of the box at the time of stabbing of the pin decreases.

Figure 5:
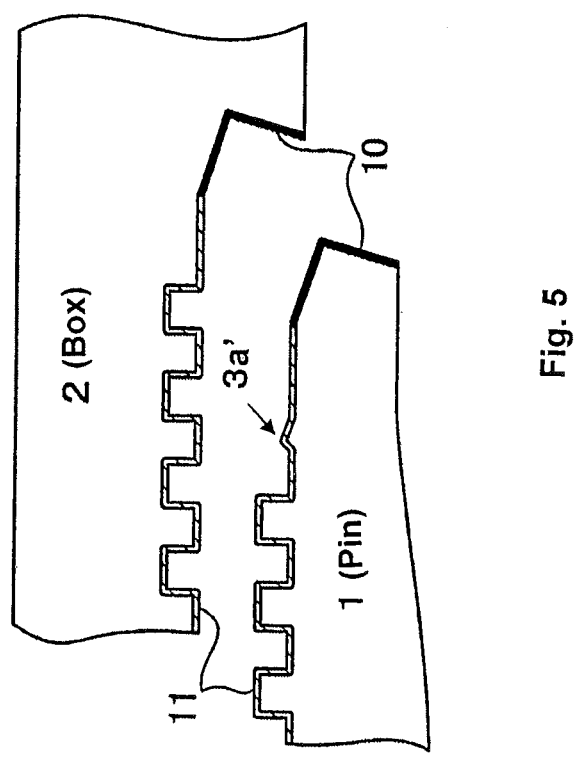
FIG. 5 shows an example of the structure of coatings on a tubular threaded joint according to the present invention.

FIG. 5 shows an embodiment in which the unthreaded metal contact portions (the seal portions and the shoulder portions) of the contact surfaces of both the pin and the box have a high-hardness solid lubricating coating 10, and the remaining portions of the contact surfaces of the pin and the box which are primarily the threaded portions have a low-hardness solid lubricating coating 11.

Figure 6:
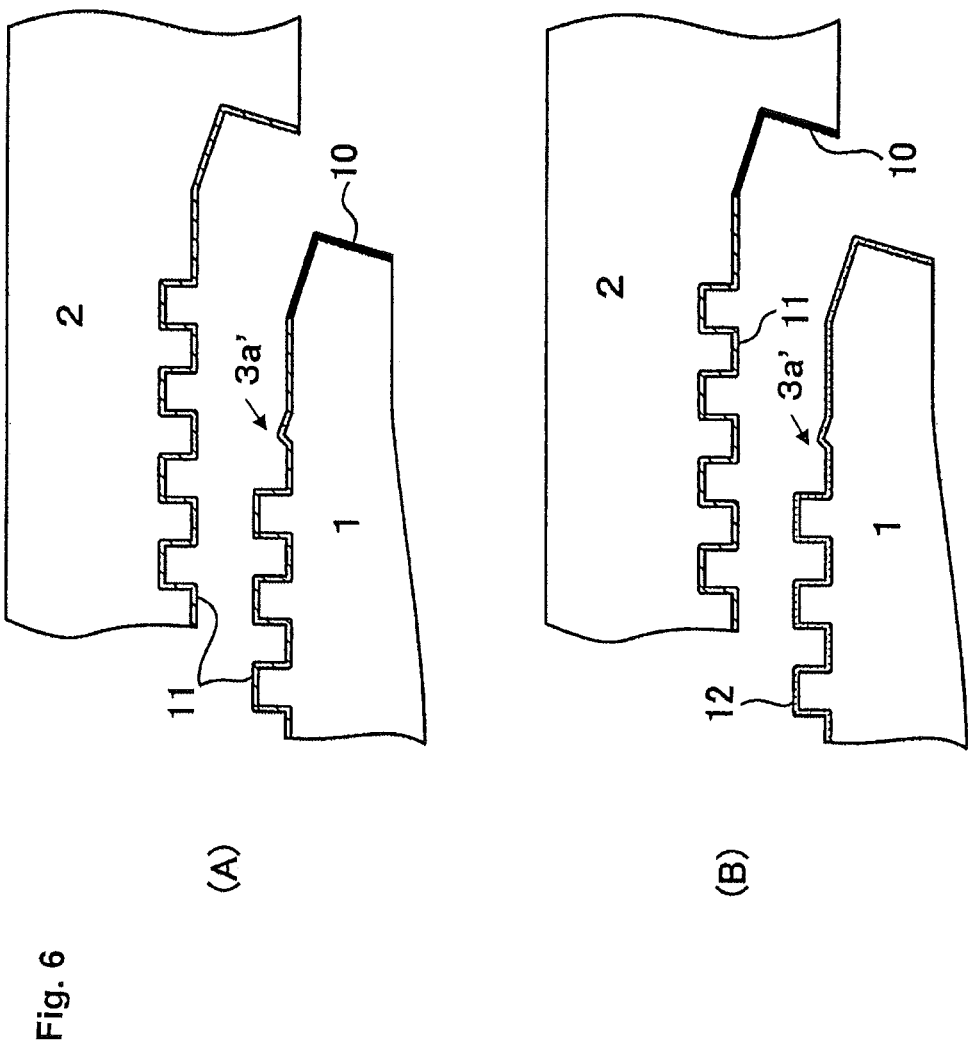
FIGS. 6(A) and 6(B) show other examples of the structure of coatings on a tubular threaded joint according to the present invention.

FIG. 6(A) shows an embodiment in which one of the pin and the box (the pin in the figure) has a high-hardness solid lubricating coating 10 which covers the unthreaded metal contact portion and a low-hardness solid lubricating coating 11 which covers the remaining portion of the contact surface in the same manner as in FIG. 5, and the entirety of the contact surface of the other member (the box in the figure) is covered by a low-hardness solid lubricating coating 11.

FIG. 6(B) shows an embodiment in which one of the pin and the box (the box in the figure) has a high-hardness solid lubricating coating 10 which covers the unthreaded metal contact portion and a low-hardness solid lubricating coating 11 which covers the remainder of the contact surface in the same manner as in FIG. 5, and the entirety of the contact surface of the other member (the pin in the figure) is covered by a solid corrosion protective coating 12.

Figure 7:
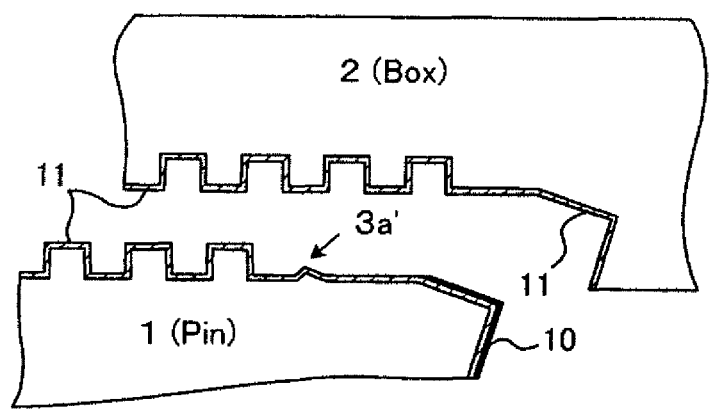
FIG. 7 shows yet another example of the structure of coatings on a tubular threaded joint according to the present invention.

As is understood by one skilled in the art, a tubular threaded joint according to the present invention can have combinations of coatings other than those described above. For example, in any of the embodiments shown in FIG. 5 and FIGS. 6(A) and 6(B), the low-hardness solid lubricating coating 11 may be present also beneath the high-hardness solid lubricating coating 10 as shown in FIG. 7. Namely, the unthreaded metal contact portion including the seal portion and the shoulder portion of the pin and/or the box is covered by two layers consisting of the lower low-hardness solid lubricating coating 11 and the upper high-hardness solid lubricating coating 10. In this case, the low-hardness solid lubricating coating 11 may be formed on the entirety of the contact surface, but it is also possible to form this coating 11 on a portion of the contact surface. For example, the low-hardness solid lubricating coating 11 may be formed so as to cover from the threaded portion to the seal portion, whereby just the seal portion is covered by the above-mentioned two layers 10 and 11 and the shoulder portion is covered by only the high-hardness solid lubricating coating 10. Furthermore, the high-hardness solid lubricating coating 10 may be formed just on the shoulder portion.

Next, various types of coatings which can cover the contact surfaces of a tubular threaded joint according to the present invention will be explained. Unless otherwise specified, percent with respect to the content of components of a coating means mass percent. This content is substantially the same as the content based on the total solids content in a coating composition for forming the lubricating coating (the total content of nonvolatile components).

[High-hardness and Low-hardness Solid Lubricating Coatings]

A high-hardness solid lubricating coating is a solid lubricating coating having a Knoop hardness which is relatively high compared with that of a low-hardness solid lubricating coating. It provides resistance to sliding in the final stage of makeup of a threaded joint (from when the shoulder portions of the pin and the box begin to contact until the seal portions intimately contact with a prescribed interference). It has the effect of making it difficult for yielding of the shoulder portions to take place even when makeup is carried out with a high torque.

The low-hardness solid lubricating coating is a solid lubricating coating having a relatively low Knoop hardness. It facilitates sliding in the initial stage of makeup of a threaded joint (from when the threads of the pin and the box contact until the seal portions of the pin and the box begin to contact), and it has the effect of lowering Ts.

In the present invention, the high-hardness solid lubricating coating which provides the above effect is formed so as to cover a portion of the contact surface including at least the shoulder portion of at least one of the pin and the box. Preferably the entirety of an unthreaded metal contact portion including the seal portion and the shoulder portion is covered by the high-hardness solid lubricating coating. When a threaded joint has a plurality of seal portions, their entirety is preferably covered by the high-hardness solid lubricating coating. However, the objective of increasing $\Delta T$ can be achieved even if only one of the seal portions which first undergoes contact in the final stage of makeup of a threaded joint is coated with the high-hardness solid lubricating coating. The portion on which the high-hardness solid lubricating coating is formed can be suitably selected in accordance with the shape of the joint and the required properties.

An example of a solid lubricating coating which is suitable for use in the present invention is a coating which is formed from an organic resin or an inorganic polymer as a film-forming component (a binder). In addition to a film-forming component, a solid lubricating coating may contain various common additives such as lubricating particles and an anticorrosive agent (a corrosion resistance modifier). By varying the combination of components or the contents of the components, two types of solid lubricating coatings having a different Knoop hardness can be formed, and these coatings are used as a high-hardness solid lubricating coating and a low-hardness solid lubricating coating.

In order to increase $\Delta T$ of a tubular threaded joint, it is desirable to satisfy the following equation:

$$\text{(Knoop hardness of high-hardness solid lubricating coating)}/\text{(Knoop hardness of low-hardness solid lubricating coating)} \geq 1.1$$

This ratio is more preferably at least 1.2 and most preferably at least 1.5. This ratio may be at least 2.0.

Both the high-hardness and low-hardness solid lubricating coatings can be formed by uniformly dispersing as necessary various additives such as lubricating particles in a solution (or a dispersion) of a film-forming component and adjusting the viscosity as necessary to prepare a coating composition, applying the coating composition to the contact surface of at least one of the pin and the box of the threaded joint, and drying the coating. The coating composition can be applied by a suitable known method such as brush application, immersion, air spraying, or the like.

Lubricating particles have the effect of improving the lubricating properties of the lubricating coating and increasing galling resistance. Examples of lubricating particles which have such an effect are carbonates, silicates, oxides, carbides, nitrides, sulfides, fluorides, graphite (including carbon-derived nanoparticles such as carbon nanotubes and carbon onions), PTFE (polytetrafluoroethylene), metal soaps, and the like. The carbonates include carbonates of an alkali metal and an alkaline earth metal such as $Na_2CO_3$, $CaCO_3$, $MgCO_3$, and the like. The silicate includes $M_xO_ySiO_2$ (where M is an alkali metal or an alkaline earth metal). The oxides include $Al_2O_3$, $TiO_2$, CaO, ZnO, $ZrO_2$, $SiO_2$, $Fe_2O_3$, $Fe_3O_4$, $Y_2O_3$, and the like. The carbides include SiC, TiC, and the like, the nitrides include TiN, BN, AlN, $Si_3N_4$, and the like, and the sulfides include molybdenum disulfide, tungsten disulfide, PbS, and the like. The fluorides include $CaF_2$, $BaF_2$, and the like. These may be used individually, or two or more types can be mixed together for use.

There is no particular limitation on the average particle diameter of the lubricating particles, but typically it is preferably in the range of 0.5-60 μm. If it is less than 0.5 μm, powder particles easily agglomerate, and it becomes difficult to uniformly disperse them in a coating layer. As a result, the performance of the resulting lubricating coating may locally become inadequate. On the other hand, if the particle diameter exceeds 60 μm, not only does the strength of a coating decrease, but its adhesion to a substrate decreases, and it is sometimes not possible to suppress the occurrence of galling.

In addition to lubricating particles, various additives including an anticorrosive agent can be added to the solid lubricating coating within a range which does not worsen galling resistance. For example, one or more anticorrosive agents selected from zinc powder, a chromium pigment, silica, and an alumina pigment may be added to improve the rust preventing properties of the solid lubricating coating itself. A particularly preferred anticorrosive agent is calcium ion-exchanged silica. The solid lubricating coating may contain an inorganic powder for adjusting sliding properties. Examples of such an inorganic powder are titanium dioxide and bismuth oxide. These anticorrosive agents, inorganic powders, and the like (namely, powder components other than the lubricating particles) can be contained in a total amount of up to 20% of the solid lubricating coating.

In addition to the above components, the solid lubricating coating may contain one or more minor additives selected from a surface active agent, a colorant, an antioxidant, and the like in an amount of up to 5%, for example. In addition, it may contain an extremely small amount (at most 2%) of an extreme pressure agent, a liquid lubricant, and the like.

Either an organic resin or an inorganic polymer (also referred to as an inorganic resin) can be used as a binder (a film-forming component).

A preferred organic resin is one having heat resistance and a suitable hardness and wear resistance. Examples of such a resin are thermosetting resins such as epoxy resins, polyimide resins, polycarbodiimide resins, phenolic resins, furan resins, and silicone resins; and thermoplastic resins such as polyolefins, polystyrenes, polyurethanes, polyamides, polyesters, polycarbonates, acrylic resins, thermoplastic epoxy resins, polyamide-imide resins, polyether-ether ketones, and polyether sulfones. A resin which is used may be a copolymer or a blend of two or more resins.

A preferred binder for a high-hardness solid lubricating coating is a polyether-ether ketone resin, a phenolic resin, a furan resin, a polyamide-imide resin, or an epoxy resin.

As a solvent for an organic resin, various low boiling point solvents including water, hydrocarbons (such as toluene), alcohols (such as isopropyl alcohol), NMP (N-methylpyrrolidone), γ-butyrolactone, and dimethyl sulfoxide can be used individually or in the form of a mixed solvent.

One or more additives may be added to the organic resin solution and are uniformly dispersed therein to prepare a coating composition. When using a thermosetting resin as a binder, from the standpoints of the adhesion and wear resistance of the coating, after the coating composition is applied to a contact surface of the threaded joint, it is preferably heated to cure the coating. The heating temperature is preferably at least 120° C. and more preferably 150-380° C. The heating time can be set based on the size of the tubular threaded joint but is preferably at least 20 minutes and more preferably 30-60 minutes.

When the binder is a thermoplastic resin, a coating composition using a solvents can be used. However, it is also possible to form a thermoplastic solid lubricating coating by the hot melt method without using a solvent. In the hot melt method, a coating composition comprising a thermoplastic resin and lubricating particles is heated to melt the thermoplastic resin, and a composition which is in a low viscosity fluid state is sprayed from a spray gun having a temperature maintaining capability for maintaining a constant temperature (normally around the same temperature as the temperature of the composition in a molten state). The heating temperature of the composition is preferably 10-50° C. higher than the melting point (the melting temperature or the softening temperature) of the thermoplastic resin. This method is suitable for use with a thermoplastic resin having a melting point of 80-320° C. and preferably 90-200° C.

In the hot melt method, the substrate which is coated (namely, the contact surface of a pin and/or a box) is preferably preheated to a temperature higher than the melting point of the thermoplastic resin. As a result, a good coating ability can be obtained. When the coating composition contains a small amount (such as at most 2%) of a surface active agent such as polydimethyl siloxane, a good coating can be Rained even if the substrate is not preheated or if the preheating temperature is lower than the melting point of the thermoplastic resin. After application, the substrate is cooled by air cooling or natural cooling to solidify the they resin, resulting in the formation of a solid lubricating coating atop the substrate.

Inorganic polymers which can be used as a binder in the present invention are compounds having a structure formed from three-dimensionally crosslinked metal-oxygen bonds such as Ti—O, Si—O, Zr—O, Mn—O, Ce—O, or Ba—O bonds. Such a compound can be formed by hydrolysis and condensation of a hydrolyzable organometal compound typified by a metal alkoxide (although other hydrolyzable inorganic compounds such as titanium tetrachloride can also be used). Useful metal alkoxides may be a compound in which the alkoxy group is a lower alkoxy group such as methoxy, ethoxy, isopropoxy, propoxy, isobutoxy, butoxy, or tert-butoxy. A preferred metal alkoxide is a titanium or silicon alkoxide, and a titanium alkoxide is particularly preferred. Among these, titanium isopropoxide is preferred because of its excellent film-forming properties.

An inorganic polymeric compound may contain an alkyl group which may be substituted with a functional group such as an amine or an epoxy group. For example, an organic compound like a silane coupling agent in which one or two of the alkoxy groups of a metal alkoxide are replaced by a non-hydrolyzable alkyl group having a functional group may be used.

When the binder is an inorganic polymeric compound, a coating composition may be formed by dispersing lubricating particles in a solution of a metal alkoxide or its partial hydrolysate, and it is applied to the contact surface of at least one of a pin and a box. After drying, a solid lubricating coating made of an inorganic polymeric compound having metal-oxygen bonds in which lubricating particles are dispersed is formed. After application, in order to promote film formation by hydrolysis, humidification treatment may be performed. This treatment can be carried out by leaving the coating for a predetermined length of time in air, with air having a relative humidity of at least 70% being preferred. Heating is preferably performed after humidification treatment. As a result of heating, hydrolysis and condensation of hydrolysates and discharge of alcohol which is a by-product of hydrolysis are promoted, a dry coating can be formed in a short period, and the adhesion of the coating which is formed is strengthened, leading to an increase in galling resistance. This heating is preferably carried out after a solvent is evaporated. The heating temperature is preferably in the range of 100-200° C. which is close to the boiling point of alcohol which is formed as a by-product, and it is effective to blow hot air on the coating during heating.

In order to form a solid lubricating coating having a high Knoop hardness, for example, a thermosetting resin or an inorganic polymer can be selected as a binder, and/or the content of inorganic solid components and particularly of lubricating particles can be increased.

In the case in which there are no portions in which a low-hardness solid lubricating coating and a high-hardness solid lubricating coating overlap, as shown in FIG. 5 (for example, when a low-hardness solid lubricating coating is formed on the threaded portions of the contact surfaces and a high-hardness solid lubricating coating is formed on the seal portions and the shoulder portions), either of the solid lubricating coatings can be formed first. In this case, heating treatment for curing the coatings may be carried out last in a single step. Namely, heating treatment is carried out after applying the coating compositions for forming the low-hardness solid lubricating coating and the high-hardness solid lubricating coating.

When there is a portion where a low-hardness solid lubricating coating and a high-hardness solid lubricating coating overlap (e.g., when a low-hardness solid lubricating coating is formed on the entirety of a contact surface), first the low-hardness solid lubricating coating is formed and then the high-hardness solid lubricating coating is formed so that the low-hardness solid lubricating coating becomes a lower layer.

As stated above, the thickness of each of the low-hardness solid lubricating coating and the high-hardness solid lubricating coating is preferably in the range of 10-150 μm. However, when there is a portion having these two types of solid lubricating coatings, the total thickness of the two coatings is preferably at most 200 μm. When the two solid lubricating coatings do not overlap, the coating thickness of the high-friction solid lubricating coating and the coating thickness of the low-friction solid lubricating coating are preferably substantially the same (such as within ±15 μm) so that a large step does not form at the border between the two types of coatings.

[Solid Corrosion Protective Coating]

As stated above with respect to FIG. 4, in a period until a tubular threaded joint is actually used, a protector is often mounted on the pin and the box which are not used for connection of a steel tube and a coupling. It is necessary that a solid corrosion protective coating not be destroyed by at least the force applied when mounting a protector, that it not dissolve when it is exposed to water resulting from condensation of water vapor by the action of the dew point during transport or storage, and that it not readily soften even at a high temperature exceeding 40° C. Any coating satisfying these requirements can be used as a solid corrosion protective coating. For example, a solid corrosion protective coating may be a coating of a thermosetting resin optionally containing an anticorrosive agent.

A preferred solid corrosion protective coating is a coating based on a UV-curable resin. Useful UV-curable resin system comprises at least a monomer, an oligomer, and a photopolymerization initiator.

Some non-limiting examples of monomers include polyvalent (di-, tri-, or higher valent) esters of polyhydric alcohols with (meth)acrylic acid, various (meth)acrylate compounds, N-vinylpyrrolidone, N-vinylcaprolactam, and styrene. Some non-limiting examples of oligomers include epoxy (meth)acrylates, urethane (meth)acrylates, polyester (meth)acrylates, polyether (meth)acrylates, and silicone (meth)acrylates.

Useful photopolymerization initiators are compounds having absorption at a wavelength of 260-450 nm, examples of which are benzoin and its derivatives, benzophenone and its derivatives, acetophenone and its derivatives, Michler's ketone, benzyl and its derivatives, tetraalkylthiuram monosulfide, and thioxanes. It is particularly preferable to use thioxanes.

From the standpoints of coating strength and sliding properties, a solid corrosion protective coating formed from a UV-curable resin may contain additives selected from lubricants, fibrous fillers, and anticorrosive agents. Examples of a lubricant are metal soaps such as calcium stearate and zinc stearate, and polytetrafluoroethylene (PTFE) resin. An example of a fibrous filler is acicular calcium carbonate such as Whiskal sold by Maruo Calcium Co., Ltd. One or more of these additives can be added in an amount of 0.05-0.35 parts by mass with respect to one part by mass of the UV-curable resin. Examples of an anticorrosive agent are aluminum tripolyphosphate and aluminum phosphite. An anticorrosive agent can be added in a maximum amount of around 0.10 parts by mass with respect to one part by mass of the UV-curable resin.

A solid corrosion protective coating formed from a UV-curable resin is often transparent. In order to facilitate quality inspection by visual inspection or image processing of the solid corrosion protective coating which is formed (inspecting whether or not there is a coating and inspecting for uniformity or unevenness of the coating thickness), the solid corrosion protective coating may contain a colorant. The colorant which is used can be selected from pigments, dyes, and fluorescent materials.

The amount of a pigment or dye which is added is preferably at most 0.05 parts by mass with respect to one part by mass of the UV-curable resin.

A fluorescent material can be any fluorescent pigments, fluorescent dyes, and phosphors used in fluorescent paints. A solid corrosion protective coating containing a fluorescent material is transparent with or without color under visible light, but when it is irradiated with a black light or ultraviolet light, it emits light and develops a color, so it is possible to ascertain whether there is a coating and whether there is unevenness in the coating thickness. In addition, since the coating is transparent under visible light, it is possible to observe the substrate, namely, the surface of the substrate under the solid lubricating coating. Accordingly, the solid corrosion protective coating does not interfere with inspection of a threaded portion of a threaded joint for damage. The amount of the fluorescent material which is added is preferably around at most 0.05 parts by mass with respect to one part by mass of the UV-curable resin.

A preferred colorant is a fluorescent material, and a fluorescent pigment is particularly preferred.

After a composition based on a UV-curable resin is applied to a contact surface of a threaded joint, the applied surface is irradiated with ultraviolet light to cure the coating, resulting in the formation of a solid corrosion protective coating based on a UV-curable resin. Irradiation with ultraviolet light can be carried out using a commercially available UV irradiation apparatus having an output wavelength in the range of 200-450 nm. Examples of a source of UV light are high pressure mercury vapor lamps, ultrahigh pressure mercury vapor lamps, xenon lamps, carbon arc lamps, metal halide lamps, and sunlight.

The thickness of the solid corrosion protective coating (the total thickness when it comprises two or more UV-curable resin layers) is preferably in the range of 5-50 μm and more preferably in the range of 10-40 μm. If the thickness of the solid corrosion protective coating is too small, it does not sufficiently function as a corrosion protective coating. On the other hand, if the coating thickness of the solid corrosion protective coating is too large, when a protective member such as a protector is mounted, the solid corrosion protective coating may be damaged by the force used to mount the protector, thereby causing corrosion resistance to become inadequate.

A solid corrosion protective coating based on a UV-curable resin is a transparent coating, so the condition of the substrate can be observed without removing the coating, and it is possible to inspect the threaded portions from atop the coating before makeup. Accordingly, by forming the solid corrosion protective coating on the contact surface of a pin which has threads formed on its outer surface and which is more easily damaged, it is possible to easily inspect for damage to the threaded portion of the pin which is easily damaged since it is typically formed on the outer surface of the end of a steel pipe while leaving the coating in place.

For this reason, such a solid corrosion protective coating is preferably formed on the contact surface of a pin, and the above-described high-hardness and low-hardness solid lubricating coatings are preferably formed on the contact surface of a box.

As is the case described above with respect to the solid lubricating coatings, the solid corrosion protective coating is preferably applied by spray coating. Spray coating includes hot melt coating.

[Preparatory Surface Treatment]

If the contact surfaces of a tubular threaded joint according to the present invention on which a high-hardness solid lubricating coating and a low-hardness solid lubricating coating or in some cases a solid corrosion protective coating are to be formed are subjected to preparatory surface treatment for surface roughening so as to increase the surface roughness from 3-5 μm which is the surface roughness after machining, the coating adhesion increases, and there is a tendency for the effects which are the object of the coating to be enhanced. Accordingly, preparatory surface treatment of a contact surface is preferably carried out to roughen the surface before forming the coatings.

When forming a coating atop a contact surface having a large surface roughness, the coating thickness is preferably greater than Rmax of the roughened contact surface in order to completely cover the contact surface. The coating thickness when the contact surface is rough is the average value of the coating thickness for the entire coating, which can be calculated from the area, the mass, and the density of the coating.

Examples of preparatory surface treatment for surface roughening are blasting treatment by projecting a blasting material such as shot having a spherical shape or grit having an angular shape, pickling by immersion in a strongly acidic solution such as a sulfuric acid, hydrochloric acid, nitric acid, or hydrofluoric acid solution in order to roughen the skin, chemical conversion treatment such as phosphate treatment, oxalate treatment, and borate treatment (as precipitated crystals which are typically acicular grow, the roughness of the crystalline surface increases), electroplating with a metal such as Cu, Fe, Sn, or Zn or an alloy of these metals (the surface may become slightly rougher due to preferential plating of projections), and impact plating which can form a porous plated coating. As one example of electroplating, composite plating which forms a plated coating having minute solid particles dispersed in metal has minute solid particles projecting from the plated coating, so it can be employed as a method of imparting surface roughness. Two or more types of preparatory surface treatment may be used in combination. Treatment may be carried out in accordance with known methods.

Regardless of which method is used for preparatory surface treatment of a contact surface, the surface roughness Rmax after surface roughening by the preparatory surface treatment is preferably 5-40 μm. If Rmax is less than 5 μm, adhesion and retention of the lubricating coating are sometimes inadequate. On the other hand, if Rmax exceeds 40 μm, friction increases, the lubricating coating cannot withstand shearing forces and compressive forces when it is subjected to a high pressure, and it becomes easier for damage to the coating or peeling of the coating to take place.

From the standpoint of the adhesion of the lubricating coating, preparatory surface treatment which can form a porous coating, namely, chemical conversion treatment and impact plating are preferred. In this case, in order to make Rmax of a porous coating at least 5 μm, the coating thickness is preferably made at least 5 μm. There is no particular upper limit on the coating thickness, but normally it is at most 50 μm and preferably it is at most 40 μm, which is adequate. By forming a lubricating coating atop a porous coating which is formed by preparatory surface treatment, the adhesion of the lubricating coating is increased by the so-called anchor effect. As a result, it becomes more difficult for peeling of the solid lubricating coating to occur even when makeup and breakout are repeated, and direct metal-to-metal contact is effectively prevented, leading to a further improvement in galling resistance, gas tightness, and corrosion preventing properties.

Particularly preferred preparatory surface treatment for forming a porous coating is phosphate chemical conversion treatment (treatment with manganese phosphate, zinc phosphate, iron-manganese phosphate, or zinc-calcium phosphate) and formation of a zinc or zinc-iron alloy coating by impact plating. From the standpoint of adhesion, a manganese phosphate coating is preferred, and from the standpoint of corrosion prevention, a zinc or zinc-iron alloy coating, which can be expected to provide a sacrificial corrosion preventing effect by zinc, is preferred.

Phosphate chemical conversion treatment can be carried out by immersion or spraying in a conventional manner. A typical acidic phosphating solution used for zinc-plated materials can be used as a chemical conversion treatment solution. For example, a zinc phosphating solution containing 1-150 g/L of phosphate ions, 3-70 g/L of zinc ions, 1-100 g/L of nitrate ions, and 0-30 g/L of nickel ions can be used. A manganese phosphating solution customarily used for a threaded joint can also be used. The temperature of the solution is from room temperature to 100° C., and the treatment time can be up to 15 minutes in accordance with the desired coating thickness. In order to promote the formation of a coating, it is possible to supply an aqueous surface modifying solution containing colloidal titanium to the surface being treated prior to phosphate treatment. After phosphate treatment, washing with hot or cold water followed by drying is preferably carried out.

Impact plating can be carried out by mechanical plating in which particles and a material to be plated are impacted with each other inside a rotating barrel, or by blast plating in which particles are impacted against a material to be plated using a blasting apparatus. In the present invention, it is sufficient to carry out plating of just the contact surfaces, so it is preferable to employ blast plating which is capable of localized plating. From the standpoints of corrosion prevention and adhesion, the thickness of a zinc or zinc alloy layer formed by impact plating is preferably 5-40 μm.

Blast plating is carried out, for example, by blasting a blast material in the form of particles having an iron-based core with their surface coated with zinc or a zinc alloy against a contact surface to be coated. The content of zinc or a zinc alloy in the particles is preferably in the range of 20-60%, and the diameter of the particles is preferably in the range of 0.2-1.5 mm. As a result of impaction, only the zinc or zinc alloy which is the coating layer of the particles adheres to the contact surface which is a substrate, and a porous coating made of zinc or a zinc alloy is formed atop the contact surface. This blast plating can form a porous metal coating having good adhesion to a steel surface regardless of the type of steel.

As another type of preparatory surface treatment, although it has almost no surface roughening effect, specific electroplating to form a single layer or multiple layers may increase the adhesion between a lubricating coating and the substrate, leading to improvement in the galling resistance of a tubular threaded joint.

Examples of such preparatory surface treatment for a lubricating coating are electroplating with metals such as Cu, Sn, and Ni or alloys thereof. Plating can be single-layer plating or multiple-layer plating with two or more layers. Specific examples of this type of electroplating are Cu plating, Sn plating, Ni plating, Cu—Sn alloy plating, Cu—Sn—Zn alloy plating, two-layer plating with Cu plating and Sn plating, and three-layer plating with Ni plating, Cu plating, and Sn plating. In particular, when a tubular threaded joint is made of a steel having a Cr content exceeding 5%, galling occurs extremely easily. In this case, it is preferable to carry out preparatory surface treatment by single-layer plating with a Cu—Sn alloy or a Cu—Sn—Zn alloy or multiple-layer metal plating with two or more layers selected from these alloy platings and Cu plating, Sn plating, and Ni plating such as two-layer plating with Cu plating and Sn plating, two-layer plating with Ni plating and Sn plating, two-layer plating with Ni plating and Cu—Sn—Zn alloy plating, and three-layer plating with Ni plating, Cu plating, and Sn plating.

These types of plating can be formed by the method set forth in JP 2003-74763 A. In the case of multiple-layer plating, the lowest layer of plating (normally Ni plating), which is referred to as strike plating, is preferably an extremely thin plating layer having a thickness of at most 1 μm. The plating thickness (the total thickness in the case of multiple-layer plating) is preferably in the range of 5-15 μm.

As another type of preparatory surface treatment, it is possible to form a solid corrosion protective coating.

EXAMPLES

The effects of the present invention will be illustrated by the following examples and comparative examples. In the following description, the contact surface of a pin including the threaded portion and the unthreaded metal contact portion will be referred to as the pin surface, and the contact surface of a box including the threaded portion and the unthreaded metal contact portion will be referred to as the box surface. The surface roughness is Rmax. Unless otherwise specified, percent means mass percent.

The pin surface and the box surface of a VAMTOP special threaded joint (outer diameter of 17.78 cm (7 inches), wall thickness of 1.036 cm (0.408 inches)) made of carbon steel having the composition shown in Table 1 was subjected to the preparatory surface treatment shown in Table 2. Thereafter, a high-hardness solid lubricating coating and a low-hardness solid lubricating coating and in some cases a solid corrosion protective coating as shown in Tables 3 and 4 were formed on the pin surface and the box surface.

The treatment and coating compositions will be described below in detail. In Table 4, the unthreaded metal contact portion means the seal portion and the shoulder portion, and the threaded portion means the portion of the contact surface other than the seal portion and the shoulder portion. When different coatings were formed on the unthreaded metal contact portion and the threaded portion, a solid lubricating coating was first formed on the unthreaded metal contact portion, and then a separate solid lubricating coating was formed on the threaded portion. When forming a solid lubricating coating on the threaded portion, coating was performed using a shielding plate so that the lubricating coating was not formed atop the previously-formed solid lubricating coating on the unthreaded metal contact portion. However, the border between these two coatings need not be clear, and the effect of the present invention can be obtained even if there is an overlapping region of around 1 mm at the border.

The Knoop hardness Hk of each solid lubricating coating was measured with a model HMV-200 microhardness tester manufactured by Shimadzu Corporation under conditions of 100 g for 10 seconds using a test piece having a solid lubricating coating formed in the same manner atop a steel plate made of the same material.

Figure 1:
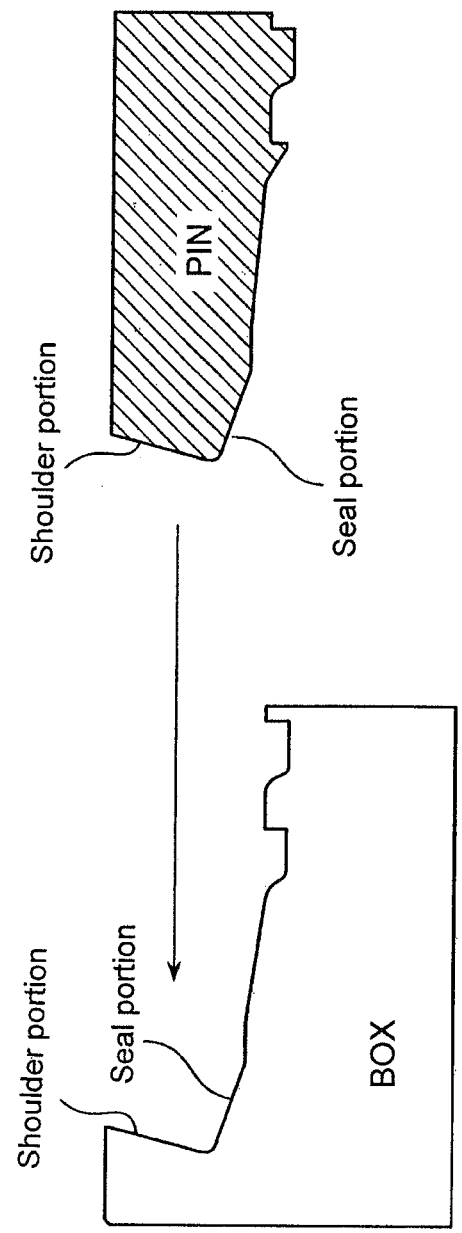
FIG. 1 schematically shows the unthreaded metal contact portions (shoulder portions and seal portions) of a special threaded joint.
Figure 2:
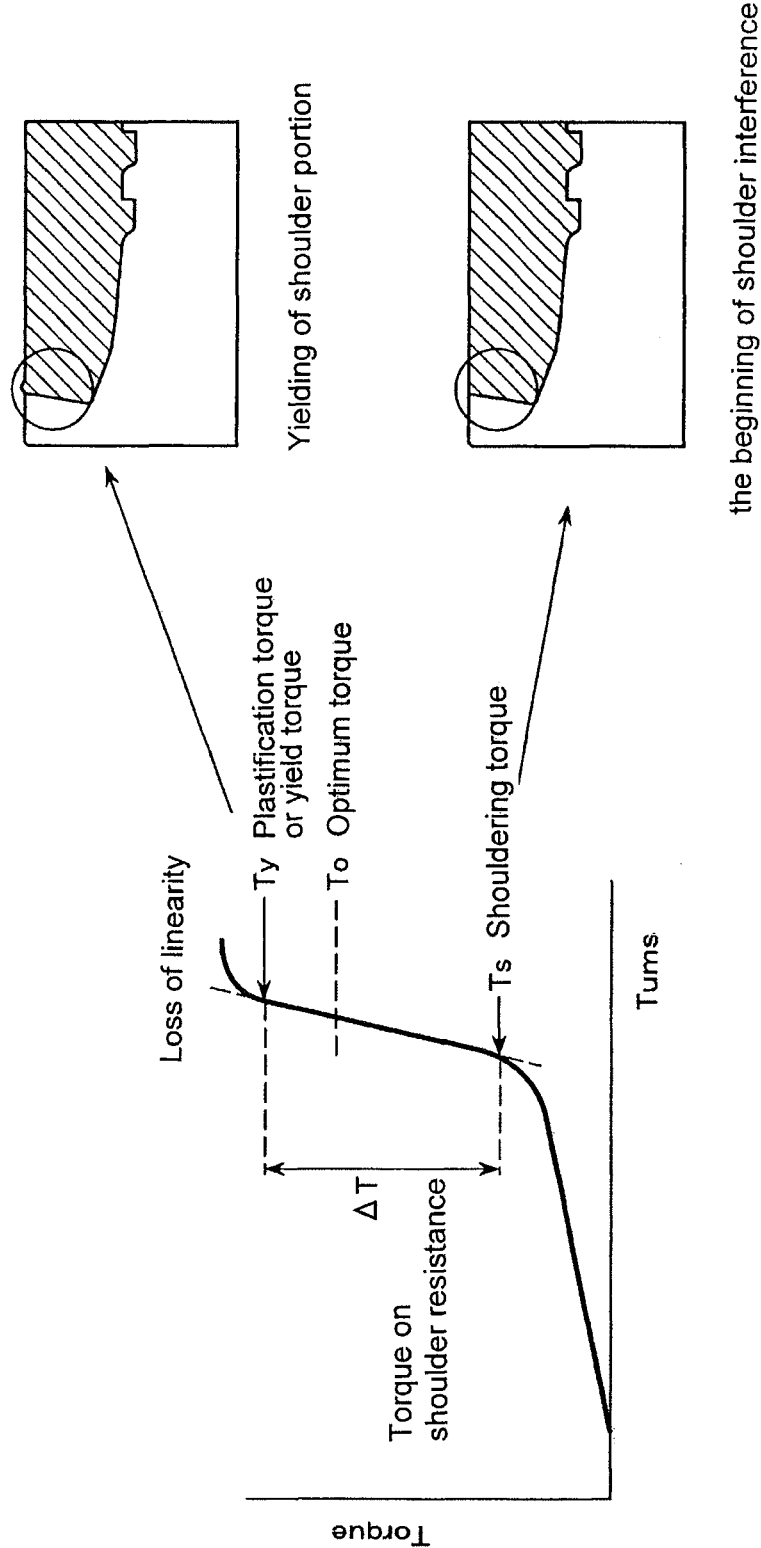
FIG. 2 is a typical torque chart of a special threaded joint at the time of makeup.

A high torque makeup test in which makeup was carried out with a high makeup torque was carried out on tubular threaded joints which were prepared in the above manner to prepare a torque chart like that shown in FIG. 2, and Ts (shouldering torque), Ty (yield torque), and ΔT (=Ty−Ts, torque on shoulder resistance) were measured on the torque chart.

Ts was the torque when the shoulder portions started to interfere. Specifically, the torque when the change in the torque after the shoulder portions interfered began to enter the linear region (elastic deformation region) was made Ts. Ty was the torque at the start of plastic deformation. Specifically, the torque after Ts was reached and when the variation in torque with rotation began to lose linearity and being separated from the linear region was made Ty. The relative values of ΔT (=Ty−Ts) when ΔT for Comparative Example 1 in Table 3, in which conventional compound grease was employed, was assigned a value of 100 are shown in Table 5.

A repeated makeup and breakout test was carried on each tubular threaded joint to evaluate galling resistance. In the repeated makeup and breakout test, makeup of a threaded joint was carried out at a makeup speed of 10 rpm with a makeup torque of 20 kN-m, and after breakout, the state of seizing of the pin surface and the box surface was investigated. When seizing scratches produced by makeup were light and makeup was again possible after repair was performed, repair was carried out and makeup and breakout were continued. Makeup was performed 10 times.

TABLE 1

Chemical composition of carbon steel (%); remainder: Fe and impurities

| C | Si | Mn | P | S | Cu | Ni | Cr | Mo |
|---|---|---|---|---|---|---|---|---|
| 0.24 | 0.3 | 1.3 | 0.02 | 0.01 | 0.04 | 0.07 | 0.17 | 0.04 |

TABLE 2

Preparatory Surface Treatment

| Pin | Box |
|---|---|
| 1. Grinding (R = 3) | 1. Grinding (R = 3) |
| 2. Zinc phosphating (R = 10) (t = 12) | 2. Ni strike plating + Cu—Sn—Zn alloy plating (t = 5) (R = 2) |

R: surface roughness (μm),
t: coating thickness (μm)
Note:
The preparatory surface treatment for the box in Example 2 was the same as the above preparatory surface treatment for the pin except that zinc phosphating was replaced by manganese phosphating.

TABLE 3

| | Solid lubricating coating | | Knoop Hardness Hk |
|---|---|---|---|
| | Binder | Lubricating particles | |
| Solid lub. coating 1 | Polyetherether ketone | PTFE | 80 |
| Solid lub. coating 2 | Polyamideimide resin + fluoroplastic | PTFE + MoS$_2$ | 62 |
| Solid lub. coating 3 | Fluoroplastic | — | 35 |
| Solid lub. coating 4 | Epoxy resin | Graphite | 48 |

TABLE 4

| | Pin | | Box | |
|---|---|---|---|---|
| No. | Unthreaded metal contact portion | Threaded portion | Unthreaded metal contact portion | Threaded portion |
| Example 1 | Solid lub. coat. 1 (Hk: 80) | Solid lub. coat. 3 (Hk: 35) | Solid lub. coat. 1 (Hk: 80) | Solid lub. coat. 3 (Hk: 35) |
| Example 2 | Solid lub. coat. 1 (Hk: 80) | Solid lub. coat. 3 (Hk: 35) | Solid lub. coat. 3 (Hk: 35) | |

TABLE 4-continued

| | Pin | | Box | |
|---|---|---|---|---|
| No. | Unthreaded metal contact portion | Threaded portion | Unthreaded metal contact portion | Threaded portion |
| Example 3 | UV-cured solid corrosion protective coating | | Solid lub. coat. 2 (Hk: 62) | Solid lub. Coat 4 (Hk: 48) |
| Compar. Example 1 | Viscous liquid compound grease in accordance with API BUL 5A2 | | | |
| Compar. Example 2 | Solid lub. coat. 3 (Hk: 35) | Solid lub. coat. 1 (Hk: 80) | Solid lub. coat. 3 (Hk: 35) | Solid lub. coat. 1 (Hk: 80) |
| Compar. Example 3 | UV-cured solid corrosion protective coating | | Solid lub. Coat 4 (Hk: 48) | Solid lub. coat. 2 (Hk: 62) |

Hk: Knoop hardness

TABLE 5

| No. | ratio of Δ T (=Ty − Ts) (%) Relative ratio (%) when the value for Comparative Example 1 was 100 |
|---|---|
| Example 1 | 135 |
| Example 2 | 116 |
| Example 3 | 110 |
| Comparative Example 1 | 100 |
| Comparative Example 2 | 48 |
| Comparative Example 3 | 74 |

Example 1

The following preparatory surface treatment and coating formation were carried out on the pin surface and the box surface of a special threaded joint made of carbon steel having the composition shown in Table 1 to form coatings having the structure shown in FIG. 5.

[Box Surface]

The box surface was finished by machine grinding (surface roughness of 3 μm), and it was then subjected to Ni strike plating followed by Cu—Sn—Zn alloy plating (Cu: 56%, Sn: 36%, a remainder of Zn, the same applies below) both performed by electroplating to obtain plated coatings having an overall thickness of 5 μm. The surface roughness after this preparatory surface treatment was 2 μm.

On the box surface which had undergone the preparatory surface treatment, solid lubricating coating 1 shown in Table 3 (a coating of a polyetherether ketone (PEEK) resin containing PTFE added as lubricating particles, Knoop hardness Hk of 80, coating thickness of approximately 20 μm) was formed on the unthreaded metal contact portion (the seal portion and the shoulder portion) and then solid lubricating coating 3 shown in Table 3 (a fluoroplastic coating with a Knoop hardness Hk of 35 and a coating thickness of approximately 20 μm) was formed on the threaded portion (the portion other than the seal portion and the shoulder portion).

[Pin Surface]

The pin surface was finished by machine grinding (surface roughness of 3 μm), and it was then subjected to zinc phosphate chemical conversion treatment by immersion for 6 minutes in a zinc phosphating solution at 75-85° C. to form a zinc phosphate coating (surface roughness of 10 μm) having a thickness of 12 μm.

The pin surface which had undergone this preparatory surface treatment was subjected to coating formation in the same manner as for the box surface. Namely, solid lubricating coating 1 was formed on the unthreaded metal contact portions, and solid lubricating coating 3 was formed on the threaded portion. Each coating had the same thickness as for the box surface.

As can be seen from Table 5, the value of $\Delta T$ in a high torque test was such that the ratio of $\Delta T$ when $\Delta T$ for Comparative Example 1 was assigned a value of 100 (referred to below as the $\Delta T$ ratio) was 135%. The $\Delta T$ ratio was greatly increased compared to a $\Delta T$ ratio of 48% for Comparative Example 2 in which the solid lubricating coatings formed on the seal portions and the shoulder portions of the pin and box surfaces and the solid lubricating coatings formed on the threaded portions of the pin and box surfaces were the opposite of those in Example 1.

Moreover, $\Delta T$ in Example 1 was increased by 35% with respect to $\Delta T$ for compound grease (Comparative Example 1), which was used as a standard since it is known to exhibit a satisfactory value of $\Delta T$. This verified that the threaded joint of Example 1 could be made up with a high torque without the occurrence of yielding of the shoulder portions. In the makeup and breakout test, makeup and breakout could be carried out 10 times without the occurrence of galling.

Example 2

The below-described preparatory surface treatment and coating formation were carried out on the pin surface and the box surface of a special threaded joint made of carbon steel having the composition shown in Table 1 to form coatings having the structure shown in FIG. 6(A).

[Box Surface]

The box surface was finished by machine grinding (surface roughness of 3 μm), and it was subjected to preparatory surface treatment by immersion for 20 minutes in a manganese phosphating solution at 90-95° C. to form a manganese phosphate coating (surface roughness of 14 μm) having a thickness of 18 μm.

On the entirety of the box surface which had undergone this preparatory surface treatment, solid lubricating coating 3 (fluoroplastic with a Knoop hardness Hk of 35 and a coating thickness of approximately 20 μm) was formed.

[Pin Surface]

The pin surface underwent exactly the same preparatory surface treatment and coating formation as the pin surface of Example 1. The Knoop hardness and the coating thickness were exactly the same as for Example 1.

As shown in Table 5, the $\Delta T$ ratio in a high torque test was 116%. Thus, $\Delta T$ for Example 2 was increased by 16% with respect to $\Delta T$ for compound grease (Comparative Example 1), which served as a standard. Namely, it was verified that the threaded joint of Example 1 could be made up with a high torque without the occurrence of yielding of the shoulder portions. In the makeup and breakout test, makeup and breakout could be performed 10 times without the occurrence of galling.

Example 3

The below-described preparatory surface treatment and coating formation were carried on the pin surface and the box surface of a special threaded joint made of carbon steel having the composition shown in Table 1 to form coatings having the structure shown in FIG. 6(B).

[Box Surface]

Preparatory surface treatment of the box surface was carried out in the same manner as for the box surface in Example 1 (grinding and then Ni strike plating followed by Cu—Sn—Zn alloy plating). On the box surface which had undergone the preparatory surface treatment, solid lubricating coating 2 shown in Table 3 (a coating of a polyamide-imide (PAI) resin and a fluoroplastic containing PTFE and $MoS_2$ as lubricating particles, Knoop hardness Hk of 62, coating thickness of approximately 22 μm) was first formed on the unthreaded metal contact portion, and then solid lubricating coating 4 in Table 3 (a coating of an epoxy resin containing graphite as lubricating particles, Knoop hardness Hk of 48, coating thickness of approximately 22 μm) was fanned on the threaded portion.

[Pin Surface]

Preparatory surface treatment of the pin surface was carried out in the same manner as for the pin surface in Example 1 (grinding and then zinc phosphating). A solid corrosion protective coating based on a UV-curable resin was formed in the following manner on the entirety of the pin surface which had undergone the preparatory surface treatment.

The coating composition which was used was prepared by adding aluminum phosphite as an anticorrosive agent and a polyethylene wax as a lubricant to a commercially available epoxy acrylic resin-based UV-curable resin paint (solventless type) manufactured by Chugoku Marine Paints, Ltd. (containing 94% of a resin, 5% of an anticorrosive agent, and 1% of a lubricant based on total solids content). This coating composition was sprayed on the entirety of the pin surface and then irradiated with ultraviolet light (wavelength of 260 nm) from an air-cooled mercury vapor lamp with an output of 4 kW to cure the coating. The coating which was formed had a thickness of 25 μm, and it was colorless and transparent, so the male threaded portion could be observed with the naked eye or with a magnifying glass from above the coating.

In the high torque test, the $\Delta T$ ratio was 110%. There was also a distinct effect of increasing the $\Delta T$ ratio compared to Comparative Example 3 in which the solid lubricating coating formed on the seal portion and the shoulder portion and the solid lubricating coating on the threaded portion of the box surface were the opposite of Example 3. The $\Delta T$ ratio was also large compared to Comparative Example 1 using conventional compound grease. In the makeup and breakout test, makeup and breakout could be performed 10 times without any problems.

Comparative Example 1

The following preparatory surface treatment and lubricating treatment were carried out on the pin surface and box surface of a special threaded joint made of carbon steel having the composition shown in Table 1.

[Box Surface]

Preparatory surface treatment of the box surface was carried out in the same manner as for the box surface in Example 1 (grinding and then Ni strike plating followed by Cu—Sn—Zn alloy plating). A viscous liquid lubricant, compound grease in accordance with API BUL 5A2 was applied to the entirety of the box surface which had undergone the preparatory surface treatment to form a lubricating coating. The total coated weight of compound grease on the pin surface and the box surface was 50 g. The total coated area was approximately 1400 $cm^2$.

[Pin Surface]

Preparatory surface treatment of the pin surface was carried out in the same manner as for the pin surface in Example 1 (grinding and then zinc phosphating). Compound grease was applied to the entirety of the pin surface which had undergone the preparatory surface treatment.

In the makeup and breakout test, in 10 cycles of makeup and breakout, there was no occurrence of galling through the tenth cycle. However, compound grease contains heavy metals such as lead, so it is harmful to humans and the environment.

In the high torque test, the joint had a high Ty such that the shoulder portions did not undergo yielding even when makeup was carried out with a high torque, and it exhibited a large ΔT. ΔT for this example was assigned a value of 100 and was used to calculate the ΔT ratio.

Comparative Example 2

The below-described preparatory surface treatment and coating formation were carried out on the pin surface and the box surface of a special threaded joint made of carbon steel having the composition shown in Table 1 to form coatings having the structure shown in FIG. 5. However, the solid lubricating coatings on the unthreaded metal contact portion and the threaded portion were formed so as to be the opposite of Example 1. Namely, a low-hardness solid lubricating coating was formed on the unthreaded metal contact portions, and a high-hardness solid lubricating coating was formed on the threaded portions.

[Box Surface]

Preparatory surface treatment of the box surface was carried out in the same manner as for the box surface in Example 1 (grinding and then Ni strike plating followed by Cu—Sn—Zn alloy plating). On the box surface which had undergone the preparatory surface treatment, solid lubricating coating 3 of Table 3 (a fluoroplastic coating with a Knoop hardness Hk of 35 and a coating thickness of approximately 20 μm) was first formed on the unthreaded metal contact portion, and then solid lubricating coating 1 shown in Table 3 (a coating of a polyetherether ketone is (PEEK) resin containing PTFE added as lubricating particles, Knoop hardness Hk of 80, coating thickness of approximately 20 μm) was formed on the threaded portion.

[Pin Surface]

Preparatory surface treatment of the pin surface was carried out in the same manner as for the pin surface in Example 1 (grinding and then zinc phosphating). The same coating formation as for the box surface was carried out on the pin surface which had undergone the preparatory surface treatment. Namely, solid lubricating coating 3 was framed on the unthreaded metal contact portion, and solid lubricating coating 1 was formed on the threaded portion. The coating thickness of each coating was the same as for the box surface.

In the makeup and breakout test, there was no occurrence of galling in 10 cycles of makeup and breakout. However, in the high torque test, the ΔT ratio was an extremely low value of 48% compared to conventional compound grease (Comparative Example 1). Namely, it was again confirmed that the ΔT ratio greatly decreases if a low-hardness solid lubricating coating is formed on the seal portions and the shoulder portions and a high-hardness solid lubricating coating is formed on the threaded portions.

Comparative Example 3

The following preparatory surface treatment and coating formation were carried out on the pin surface and the box surface of a special threaded joint made of carbon steel having the composition shown in Table 1 to form coatings having the structure shown in FIG. 6(B). However, solid lubricating coatings were formed on the unthreaded metal contact portion and the threaded portion of the box surface so as to be the opposite of Example 3. Namely, a low-hardness solid lubricating coating was formed on the unthreaded metal contact portion and a high-hardness solid lubricating coating was formed on the threaded portion of the box surface.

[Box Surface]

Preparatory surface treatment of the box surface was carried out in the same manner as for the box surface in Example 1 (grinding and then Ni strike plating followed by Cu—Sn—Zn alloy plating). On the box surface which had undergone the preparatory surface treatment, solid lubricating coating 4 shown in Table 3 (a coating of an epoxy resin containing graphite as lubricating particles, Knoop hardness Hk of 48, coating thickness of approximately 22 μm) was first formed on the unthreaded metal contact portion, and then a solid lubricating coating 2 shown in Table 3 (a coating of a polyamide-imide resin and a fluoroplastic containing PTFE and $MoS_2$ as lubricating particles, Knoop hardness Hk of 62, coating thickness of approximately 22 μm) was formed on the threaded portion.

[Pin Surface]

The pin surface underwent preparatory surface treatment and formation of a UV-cured solid corrosion protective coating in exactly the same manner as for the pin surface of Example 3.

In the makeup and breakout test, there was no occurrence of galling in 10 cycles of makeup and breakout. However, in the high torque test, the ΔT ratio was a low value of 74% compared to Comparative Example 1 in which conventional compound grease was used. In addition, it can be seen that the ΔT ratio was 36% smaller than in Example 3 in which the solid lubricating coating formed on the seal portion and the shoulder portion and the solid lubricating coating formed on the threaded portion of the box surface were the opposite.

As described above, it was verified that if the Knoop hardness of a solid lubricating coating formed on the seal portion and the shoulder portion is higher than the Knoop hardness of a solid lubricating coating formed on the threaded portion in accordance with the present invention, the ΔT ratio increases. Due to ΔT being high, it is possible to carry out makeup operations without the occurrence of yielding of the shoulder portions or galling even at the time of makeup with a high torque.

In order to investigate the rust preventing properties of the tubular threaded joints manufactured in Examples 1-3, the same preparatory surface treatment as shown for the box in Table 2 and formation of lubricating coatings shown for the box in Table 3 were carried out on separately prepared coupon test pieces (70 mm×150 mm×1.0 mm thick). The test pieces were subjected to a salt water spray test (in accordance with JIS Z 2371, which corresponds to ISO 9227, temperature of 35° C. and length of 1000 hours) and a humidity test (in accordance with JIS K 5600-7-2, which corresponds to ISO 6270, temperature of 50° C., relative humidity of 98%, length of 200 hours) to investigate for the occurrence of rust. As a result, it was confirmed that there was no occurrence of rust in either test for the tubular threaded joints of Examples 1-3.

When a tubular threaded joint prepared in each of Examples 1-3 was tested by a gas tightness test and an actual use test in an actual drilling apparatus, each exhibited satisfactory properties. ΔT was larger than for a conventional compound grease, so it was verified that makeup can be carried out in a stable manner with a high makeup torque.

The present invention has been explained above with respect to embodiments which are currently considered preferred, but the present invention is not limited to the above-described embodiments. It is possible to make modifications within a range which is not contrary to the technical concept of the invention as comprehended from the claims and the specification as a whole, and it should be understood that a threaded joint with such modifications falls within the technical scope of the present invention.

The invention claimed is:

1. A tubular threaded joint comprised of a pin and a box each having a contact surface comprising a threaded portion and an unthreaded metal contact portion which includes a seal portion and a shoulder portion, a first solid lubricating coating is present on or over a portion including the shoulder portion of the contact surface of at least one of the pin and the box, a second solid lubricating coating is present on at least a portion of the contact surface of the at least one of the pin and the box not having the first solid lubricating coating, wherein the first solid lubricating coating is present on the contact surface or on the second solid lubricating coating, the Knoop hardness of the first solid lubricating coating is higher than the Knoop hardness of the second solid lubricating coating.

2. A tubular threaded joint as set forth in claim 1 wherein the first solid lubricating coating is present on the unthreaded metal contact portion of the contact surface.

3. A tubular threaded joint as set forth in claim 2 wherein the unthreaded metal contact portion of at least one of the pin and the box has the first solid lubricating coating, and the threaded portion of the at least one of the pin and the box has the second solid lubricating coating.

4. A tubular threaded joint as set forth in claim 1 wherein the ratio of the Knoop hardness of the first solid lubricating coating to the Knoop hardness of the second solid lubricating coating is at least 1.1.

5. A tubular threaded joint as set forth in claim 1 wherein the contact surface of at least one of the pin and the box have undergone surface treatment by a method selected from blasting, pickling, phosphate chemical conversion treatment, oxalate chemical conversion treatment, borate chemical conversion treatment, electroplating, impact plating, and two or more of these methods prior to coating formation.

6. A tubular threaded joint as set forth in claim 1 wherein each of the first and second solid lubricating coatings has a coating thickness of 10-150 μm and/or a total thickness of the first and second solid lubricating coatings is at most 200 μm in a portion where the first and second solid lubricating coatings overlap.

7. A tubular threaded joint comprised of a pin and a box each having a contact surface comprising a threaded portion and an unthreaded metal contact portion which includes a seal portion and a shoulder portion, a first solid lubricating coating is present on or over a portion including the shoulder portion of the contact surface of at least one of the pin and the box, a second solid lubricating coating is present on at least a portion of the contact surface of the at least one of the pin and the box not having the first solid lubricating coating, the Knoop hardness of the first solid lubricating coating is higher than the Knoop hardness of the second solid lubricating coating, wherein the contact surface of one of the pin and the box has the first solid lubricating coating on a portion thereof including the shoulder portion and the second solid lubricating coating on at least a portion thereof which does not have the first solid lubricating coating, and the contact surface of the other of the pin and the box has a solid corrosion protective coating.

8. A tubular threaded joint as set forth in claim 7 wherein the solid corrosion protective coating is a UV-curable resin-based coating.

* * * * *